(12) United States Patent
Karlsson et al.

(10) Patent No.: US 9,215,291 B2
(45) Date of Patent: Dec. 15, 2015

(54) DEVICE AND METHOD FOR UE AGGREGATE MAXIMUM BIT RATE

(75) Inventors: Josefin Karlsson, Torslanda (SE); John Stenfelt, Gothenburg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1076 days.

(21) Appl. No.: 13/289,387

(22) Filed: Nov. 4, 2011

(65) Prior Publication Data

US 2013/0107799 A1    May 2, 2013

Related U.S. Application Data

(63) Continuation of application No. PCT/EP2011/068727, filed on Oct. 26, 2011.

(51) Int. Cl.
| | |
|---|---|
| *H04W 4/00* | (2009.01) |
| *H04W 40/00* | (2009.01) |
| *G06F 15/16* | (2006.01) |
| *G06F 15/173* | (2006.01) |
| *H04L 29/08* | (2006.01) |
| *H04L 29/06* | (2006.01) |
| *H04W 76/02* | (2009.01) |
| *H04W 72/04* | (2009.01) |
| *H04L 12/66* | (2006.01) |
| *H04W 84/02* | (2009.01) |

(Continued)

(52) U.S. Cl.
CPC .............. *H04L 67/306* (2013.01); *H04L 12/66* (2013.01); *H04L 29/06217* (2013.01); *H04L 29/06326* (2013.01); *H04L 41/5051* (2013.01); *H04L 47/14* (2013.01); *H04L 47/20* (2013.01); *H04L 65/1016* (2013.01); *H04L 65/1069* (2013.01); *H04W 8/082* (2013.01); *H04W 72/0406* (2013.01); *H04W 76/02* (2013.01); *H04W 84/02* (2013.01)

(58) Field of Classification Search
CPC ............... H04L 2012/5614; H04L 2012/5618; H04L 12/66; H04L 29/0621; H04L 29/06217; H04L 29/06319; H04L 29/06326; H04L 41/5041; H04L 41/5051; H04L 47/14; H04L 47/20; H04L 47/25; H04L 47/827; H04L 65/1013; H04L 65/1016; H04L 65/1066; H04L 65/1069; H04L 67/306; H04W 8/08; H04W 8/082; H04W 8/085; H04W 28/0205; H04W 28/0231; H04W 28/08; H04W 28/10; H04W 72/04; H04W 72/0406; H04W 72/0413; H04W 72/042; H04W 72/1205; H04W 72/1263; H04W 76/02; H04W 84/02; H04W 84/12

See application file for complete search history.

(56) References Cited

U.S. PATENT DOCUMENTS

| | | | |
|---|---|---|---|
| 8,958,306 B2 * | 2/2015 | McCann et al. | 370/241 |
| 2007/0165630 A1 * | 7/2007 | Rasanen et al. | 370/389 |

(Continued)

*Primary Examiner* — Alpus H Hsu
(74) *Attorney, Agent, or Firm* — Rothwell, Figg, Ernst & Manbeck, P.C.

(57) ABSTRACT

A policy control node, a PCN, for a first PLMN, the PCN comprising a PCRF, the PCN having an interface towards an SPR/UDR, in the first PLMN, the PCRF of the PCN being arranged to receive a request from another node in the first PLMN or in a second PLMN for establishing a PDN-connection for a UE. The PCRF is arranged to, as a result of said request, send a query to the SPR/UDR regarding whether or not the PCRF is allowed to set the upper limit for the UE-AMBR for the UE, the PCRF being arranged to, if the reply from the SPR/UDR to the query is positive, determine and transmit the upper limit of the UE-AMBR for the UE to said other node.

11 Claims, 4 Drawing Sheets

(51) Int. Cl.
*H04L 12/801* (2013.01)
*H04W 8/08* (2009.01)
*H04L 12/24* (2006.01)
*H04L 12/813* (2013.01)

(56) References Cited

U.S. PATENT DOCUMENTS

| | | | |
|---|---|---|---|
| 2009/0052384 A1* | 2/2009 | Zisimopoulous et al. | 370/329 |
| 2009/0086705 A1* | 4/2009 | Zisimopoulos et al. | 370/347 |
| 2010/0290392 A1* | 11/2010 | Rasanen et al. | 370/328 |
| 2011/0075675 A1* | 3/2011 | Koodli et al. | 370/401 |
| 2011/0103310 A1* | 5/2011 | Stojanovski et al. | 370/328 |
| 2011/0158090 A1* | 6/2011 | Riley et al. | 370/230 |
| 2011/0170517 A1* | 7/2011 | Bakker et al. | 370/331 |
| 2011/0171953 A1* | 7/2011 | Faccin et al. | 455/426.1 |
| 2011/0188457 A1* | 8/2011 | Shu et al. | 370/329 |
| 2011/0211465 A1* | 9/2011 | Farrugia et al. | 370/252 |
| 2011/0267980 A1* | 11/2011 | Calippe et al. | 370/254 |
| 2012/0030331 A1* | 2/2012 | Karampatsis | 709/223 |
| 2012/0044867 A1* | 2/2012 | Faccin et al. | 370/328 |
| 2012/0202491 A1* | 8/2012 | Fox et al. | 455/435.1 |
| 2012/0215930 A1* | 8/2012 | Stenfelt et al. | 709/228 |
| 2012/0220330 A1* | 8/2012 | Goldner et al. | 455/517 |
| 2012/0221723 A1* | 8/2012 | Cutler et al. | 709/225 |
| 2012/0224564 A1* | 9/2012 | Paisal et al. | 370/331 |
| 2012/0239771 A1* | 9/2012 | Rasanen | 709/206 |
| 2012/0278472 A1* | 11/2012 | Ellis et al. | 709/224 |
| 2012/0290713 A1* | 11/2012 | Ellis | 709/224 |
| 2012/0297074 A1* | 11/2012 | Mo et al. | 709/227 |
| 2012/0324100 A1* | 12/2012 | Tomici et al. | 709/224 |
| 2013/0121298 A1* | 5/2013 | Rune et al. | 370/329 |

* cited by examiner

DEVICE AND METHOD FOR UE AGGREGATE MAXIMUM BIT RATE

CROSS REFERENCE TO RELATED APPLICATION

The present application is a continuation of International Application No. PCT/EP2011/068727, filed on Oct. 26, 2011, the entire contents of which are incorporated by reference herein.

TECHNICAL FIELD

The present invention discloses a device and a method for setting the upper limit for the AMBR, Aggregate Maximum Bit Rate, for a User Equipment in a Public Land Mobile Network.

BACKGROUND

In present day Public Land Mobile Networks, such as, for example, cellular networks, the upper limit for the parameter UE-AMBR, UE Aggregate Maximum Bit Rate, is handled by mobility management nodes such as (depending on the kind of system) Mobility Management Entity (MME), various embodiments of Serving GPRS Support Node (SGSN), and such nodes as eNodeB and Radio Network Controller (RNC).

The handling of the upper limit for the UE-AMBR as described above leads to various problems, such as a limited flexibility in varying the upper limit UE-AMBR for a UE.

SUMMARY

It is a purpose of the invention to obviate at least some of the disadvantages listed above in handling the upper limit for the UE-AMBR in a Public Land Mobile Network, a PLMN. This purpose is addressed by the present invention by disclosing a policy control node, a PCN, for a first PLMN.

The PCN comprises a Policy and Charging Rules Function, a PCRF. The PCN is arranged to have an interface towards a Subscription Profile Repository/User Data Repository, i.e. an SPR/UDR in the first PLMN.

The PCRF of the PCN is arranged to receive a request from another node in the first PLMN or in a second PLMN for establishing a PDN-connection for a user equipment, a UE.

The PCRF of the PCN is arranged to, as a result of the request, send a query to the SPR/UDR regarding whether or not the PCRF is allowed to set the upper limit for the UE-AMBR for the UE in question. The PCRF is arranged to, if the reply from the SPR/UDR to the query is positive, determine and transmit the upper limit of the UE-AMBR for the UE in question to the other node in the cellular communications system.

By means of letting a PCN, through its PCRF function, set the upper limit for the UE-AMBR for the UE, a number of advantages are gained, such as, for example, increased flexibility in setting the upper limit for the UE-AMBR. In addition, by requiring the PCN node to query the SPR/UDR for permission to set the upper limit of the UE-AMBR, conflicts between different PCN nodes which want to set this value for the UE's UE-AMBR are avoided.

In embodiments, the PCN is arranged to have a Gx interface towards a Gateway node, a GW node, in the first PLMN, and to receive the request for establishing a PDN-connection for a certain UE from the GW node over this Gx interface.

In embodiments, the PCN is arranged to have an S9 interface towards another PCRF in a second PLMN, and to receive the request for establishing a PDN-connection for a UE from this other PCRF over the S9 interface. Such embodiments thus handle the case of roaming UEs, i.e. UEs which are in another PLMN than their "home PLMN", their HPLMN, and have roamed into another PLMN, a so called "Visited PLMN", VPLMN.

In embodiments of the PCN, its PCRF is arranged to receive an authorization query and a corresponding authorization reply in reply to the PCRF's first query to the SPR/UDR, and to transmit the authorization query and the corresponding authorization reply to the other node.

In embodiments of the PCN, its PCRF is arranged to receive an authorization query in the request from the other node for establishing a PDN-connection for a UE, and to use this authorization query in the PCRF's query to the SPR/UDR, and to receive an authorization reply from the SPR/UDR for transmission to the other node, the authorization reply signifying that the PCRF is allowed to set the upper limit of the UE-AMBR for the UE in question.

The invention also discloses a mobility controlling node for a Public Land Mobile Network, a PLMN. The mobility controlling node is arranged to send, via a Gateway node, a request to a PCRF function in a PCN node for establishing a PDN-connection for a user equipment, a UE.

The mobility controlling node is arranged to receive from the PCRF function in the PCN node, in reply to said request, the upper limit of the UE-AMBR for the UE.

In embodiments, the mobility controlling node is arranged to receive from the PCRF function of the PCN an authorization query and a corresponding authorization reply for use in verifying that a PCRF function in a PCN is allowed to change the upper limit of the UE-AMBR of the UE.

In embodiments, the mobility controlling node is an MME in an LIE system or an SGSN in a 3G system.

BRIEF DESCRIPTION OF THE DRAWINGS

The invention will be described in more detail in the following, with reference to the appended drawings, in which.

DETAILED DESCRIPTION

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

Figure 1:
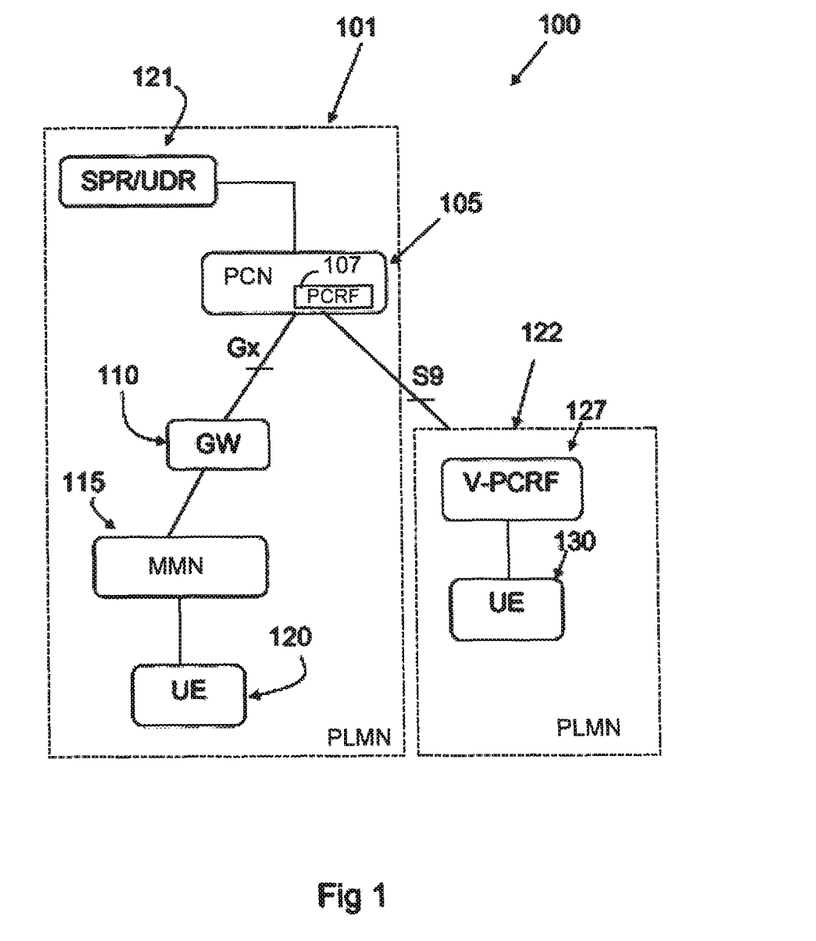
FIG. 1 shows a schematic block diagram of a first system with the invention.

FIG. 1 shows a schematic view of a cellular communication system 100. The cellular communication system spans over two Public Land Mobile Networks, PLMNs, shown as PLMN 101 and PLMN 122 in FIG. 1. Both of the PLMN 101 and PLMN 122 shown in FIG. 1 are arranged to accommodate a number of User Equipments, UEs, of which two, 120, 130, are shown, one in each PLMN. Each UE in the cellular communications system 100 has a Home PLMN, H-PLMN, and can roam into other PLMNs, which are then referred to as Visited PLMNs, V-PLMN, for that UE. Thus, for example, if the UE 130 has the PLMN 101 as its H-PLMN, the PLMN 122 becomes a V-PLMN for the UE 130, accordingly PLMN 122 may also be referred to as V-PLMN 122.

It should be pointed out that both the cellular communications network 100 and the PLMNs 101 and 122 comprise a number of nodes and functions which are not shown in FIG. 1 and which are not described explicitly in this text. In addition, the PLMN 101 will be described in more detail than the PLMN 122.

In the PLMN 101, there is shown an UE 120, which is connected to a mobility management node (MMN) 115 (a.k.a., MME/SGSN), which, depending on the kind of system, can either be a so called Mobility Management Entity (MME) or a Serving GPRS Support Node (SGSN), for which reason the mobility management node 115 is shown as MME/SGSN in FIG. 1. MMEs are utilized in LTE systems and SGSNs are utilized in 3G systems.

The MME/SGSN 115 is in turn connected to a Gateway 110, GW, which can, for example, be a Packet Data Network Gateway, a PDN-GW, or a Gateway GPRS Support Node, a GGSN. The GW 110 is connected to a Policy Control Node, PCN 105, which can either be a "stand alone" node or it can be integrated into other nodes, e.g. the MME/SGSN 115 or the GW 110. The PCN 105 comprises a so called Policy Charging and Rules Function (PCRF) 107. The PLMN 101 also comprises a so called Subscription Profile Repository and/or a User Data Repository, shown in FIG. 1 as SPR/UDR 121, to which the PCN 105 has an interface.

As shown in FIG. 1, the PCN 105 has an interface towards the GW 110, a so called Gx interface. Alternatively, or as a complement, the PCN node 105 has a so called S9 interface towards a PCRF 127 in the PLMN 122. As seen from the PLMN 101, the PLMN 122 becomes a so called V-PLMN, a "Visited" PLMN 122, into which. UEs from the PLMN 101 may roam, thus the name Visited PLMN, since a V-PLMN will not be the "Home" PLMN, H-PLMN, for a roaming UE from another PLMN such as the PLMN 101. One such roaming UE in the V-PLMN 122 is the UE 130.

In present-day systems, the UE Aggregated Maximum Bit Rate, the UE AMBR, for an UE such as the UE 120 has an upper limit which is set by the MME/SGSN 115 and which is defined by the UE's subscribed UE-AMBR. However, according to the invention, the upper limit of the UE-AMBR for an UE such as, for example, the UE 120 (as well as, where applicable, for the UE 130, i.e. for a UE in a V-PLMN) is instead determined by the PCRF in the PCN 105 of the UE's H-PLMN. (It can be pointed out that instead of the term "the upper limit of the UE-AMBR", the term "a value for the upper limit of the UE-AMBR", might also be used, since what is determined by the PCRF is of course a value which is to be used as the upper limit of the UE-AMBR.)

The upper limit of the UE-AMBR as set by the PCRF is then sent from the PCRF to the MME/SGSN 115 via the GW 110. The upper limit of the UE-AMBR which is set by the PCRF in the PCN node 105 is here also referred to as the authorized UE-AMBR. The authorized UE-AMBR supersedes the "subscribed" UE-AMBR which is available in the MME/SGSN.

The PCRF of the PCN 105 is arranged to determine the authorized UE-AMBR upon receiving a request for establishing a PDN-connection for a UE.

Three cases can be discerned here:

1) The UE for which the request is made is in its H-PLMN, e.g. the UE 120 in the PLMN 101.

Figure 2:
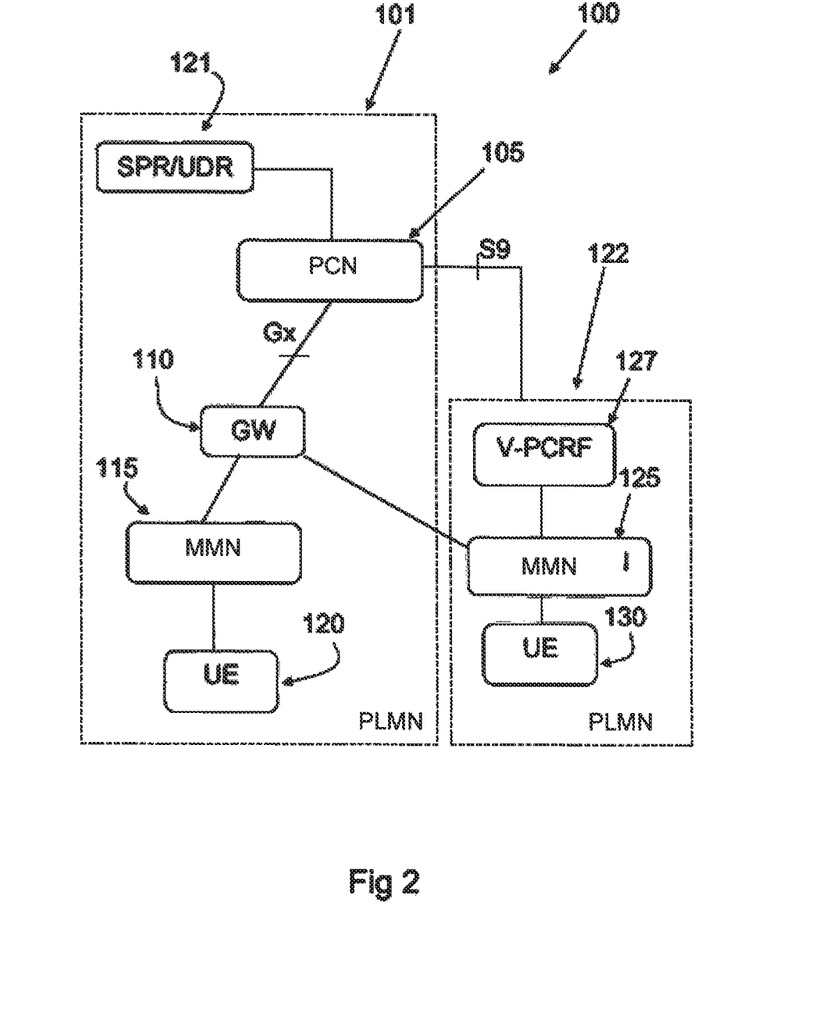
FIG. 2 shows a schematic block diagram of a second system with the invention.

2) The UE for which the request is made is in a V-PLMN, e.g. the UE 130 in the PLMN 122, but uses so called "roaming with home routed access". This case is shown in FIG. 2, which shows that in such cases, the PLMN 122 needs to comprise a second MME/SGSN 125, which has an interface towards the GW 110 in the PLMN 101, i.e. in the H-PLMN of the UE 130.

3) The UE for which the request is made is in a V-PLMN, e.g. the UE 130 in the PLMN 122 and the GW resides in the V-PLMN, so called "roaming with visited access".

In the first case, the request for establishing a PDN-connection for the UE 120 is received by the PCN 105 via its interface to the GW 110, i.e. the Gx interface. Thus, the entire "path" for this request is UE-MME/SGSN-GW-PCN.

In the second case, the request for establishing a PDN connection for the UE 120 is also received by the PCN 105 from the GW 110, but the GW 110 has received the request from the MME/SGSN 125 in the VPLMN.

In the third case, the request for establishing a PDN-connection for the UE 130 is received by the PCN 105 from the PCRF in the V-PLMN 122, i.e. a V-PCRF 125, over the S9 interface.

The PCRF function in the PCN node 105 determines the authorized UE-AMBR during the PDN-connection establishment based on applicable policies and on the applicable scenario, as follows:

If the UE in question is in its H-PLMN, i.e. the PLMN 101, as is the case for the UE 120 in FIG. 1, or alternatively the UE in question is in a V-PLMN, i.e. the PLMN 122 in FIG. 1, as in the case for UE 130 in FIG. 1, and so called "home routed access" is used, i.e. the first and second of the three cases described above, the value for the Authorized UE-AMBR is sent from the PCRF function in the PCN node 105 only if this is allowed by SPR/UDR 121, as will be described in more detail below.

If the subscriber is in a V-PLMN and so called "visited access" is used, as is the case with the UE 130 in the PLMN 122 in FIG. 1, i.e. the third of the three cases described above, the S9 interface is used and the H-PCRF (the PCRF in the UE's H-PLMN) i.e. the PCRF function in the PCN 105, then makes the policy decision. The value for the authorized UE-AMBR is sent from the H-PCRF only if this is allowed by SPR/UDR 121, as will be described in more detail below.

Turning now to how the SPR/UDR 121 can check if a PCRF function is or isn't allowed to determine a value for the authorized UE-AMBR for a UE, this is preferably carried out as follows, in the case of an UE in its H-PLMN:

The PCRF in the system 100 which is the first to receive a request (as kept track of by the SPR/UDR 121) for establishing a PDN-connection for a certain UE, receives a "PCRF Query" and a "PCRF reply", from the SPR/UDR 121 during the PDN-connection establishment, and forwards the PCRF query and PCRF reply to the MME/SGSN 115 or to the MME/SGSN function in the PLMN 122. The "PCRF query" is then transmitted from the MME/SGSN to other PCRFs in connection to subsequent requests to the PCRFs for establishing PDN-connections for the same UE. If such subsequent PCRFs report the correct "PCRF reply" to the MME/SGSN, the MME/SGSN can see that the PCRF received the correct "PCRF reply" from the SPR/UDR and that the PCRF was thus allowed by the SPR/UDR to set the authorized UE-AMBR for the UE in question. The MME/SGSN is now able to keep track of which PCRFs that have received the proper "PCRF reply" in response to the "PCRF query" from the SPR/UDR, and does not need to send the "PCRF query" to such PCRFs in the future for other PDN connections for one and the same UE.

The "PCRF query" and the corresponding "PCRF reply" can also be seen as an authorization query and its corresponding authorization reply.

Figure 3:
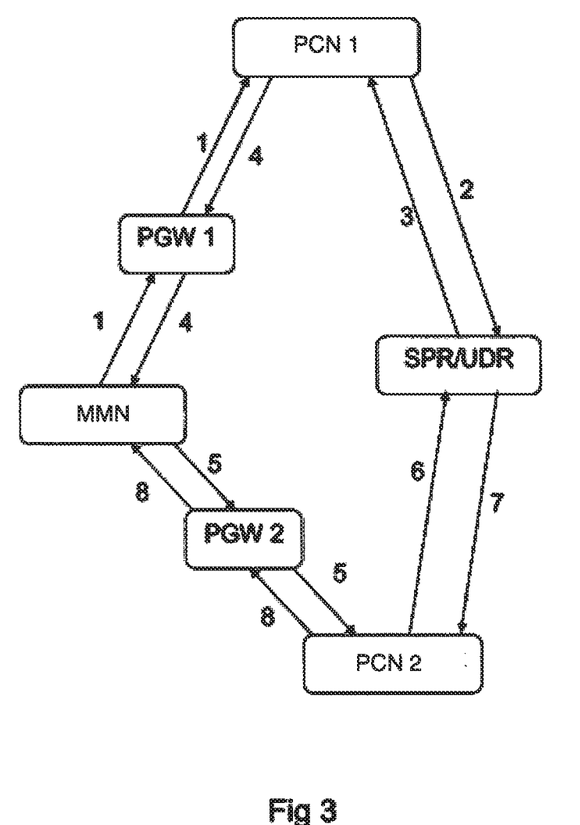
FIG. 3 shows an event diagram.

The mechanism of using an authentication query and an authentication reply in the interaction between the PCRF function(s) in a system and the SPR/UDR 121 and the MME/SGSN 115 is illustrated in FIG. 3, where the numbers refer to the following chain of events:

1. A request for establishing an PDN-connection for a (not shown) UE is transmitted from an MME/SGSN via a first PGW 1 to a first PCRF function of a PCN, shown as PCN/PCRF 1 in FIG. 3.

2. PCRF 1 transmits a query to the SPR/UDR of the PCRF's H-PLMN, regarding whether or not PCRF 1 is allowed to set the upper limit of the UE-AMBR for the UE in question.

3. The SPR/UDR determines that PCRF 1 is the first PCRF function to make such a query for the UE in question for establishing a new PDN-connection, and returns a reply to PCRF 1 indicating that PCRF 1 is allowed to set the UE-AMBR for the UE in question. In addition, the SPR/UDR also transmits a the authorization query and its accompanying authorization reply to PCRF1, for use in further queries by other PCRFs which wish to set the UE-AMBR for the UE in question. The authorization query can, for example, be "abc", and the proper response can, for example, be "xyz".

4. PCRF 1 continues the PDN-connection establishment, and transmits (via PGW 1) the authorization query and its corresponding authorization reply to the MME/SGSN, i.e. PCRF 1 transmits to the MME/SGSN the authorization quern "abc" which should be included in further UE-AMBR queries to the SPN/UDR for this UE, as well as the proper response, i.e. the authorization reply, which, using the example from above, is "xyz".

5. A second PDN-connection is requested by the same UE via the MME/SGSN (and via PGW 2) to a second PCRF, PCRF 2. The MME/SGSMN now includes the authorization query (e.g. "abc") to PCRF 2, to be forwarded to the SPR/UDR.

6. PCRF 2 transmits a query to SPR/UDR regarding whether or not PCRF 2 is allowed to determine the upper limit of the UE-AMBR for the UE in question. In its query to SPR/UDR, PCRF 2 includes the authorization query, e.g. "abc", as mentioned above.

7. The SPR/UDR checks whether or not PCRF 2 is allowed to determine the upper limit of the UE-AMBR for the UE in question. If this is the case, the SPR/UDR transmits a reply to PCRF 2 indicating that PCRF 2 is allowed to determine the upper limit of the UE-AMBR for the UE in question, and includes the proper reply, i.e. the authorization reply, e.g. "xyz" as exemplified above.

If, on the other hand, the SPR/UDR determines, by means of checking the query from PCRF 2, that PCRF 2 should not be allowed to determine the upper limit of the UE-AMBR for this UE, the SPR/UDR transmits a negative response to PCRF 2, which forwards this to the MME/SGSN. It should also be noted that an erroneous configuration which results in a positive answer from the SPR/UDR can be detected by the MME/SGSN: assume, for example, that the SPR/UDR returns a positive answer to PCRF 2, and that PCRF 2 then transmits an erroneous authorization reply, e.g. "xyM" to the MME/SGSN, the MME/SGSN will still be able to detect that PCRF 2 should not be allowed to set the upper limit of the UE-AMBR for the UE in question, and can log this event.

8. PCRF 2 forwards the reply from the SPR/UDR to the MME/SGSN, i.e. that PCRF 2 is allowed to determine the upper limit of the UE-AMBR for the UE in question. PCRF2 also includes the authorization reply received from the SPR/UDR, e.g. "xyz".

9. The MME/SGSN checks if the authorization reply included from PCRF 2 is the proper one to the authorization query, e.g. "abc", and if this is the case, allows PCRF 2 to set the upper limit of the UE-AMBR for the UE in question, i.e. the MME/SGSN accepts a value determined by PCRF 2 for the UE in question. If PCRF 2 is found by the MME/SGSN to have included an erroneous authorization reply, values for the upper limit of the UE-AMBR as set by PCRF 2 for the UE in question are not accepted by the MME/SGSN, as an alternative to which the MME/SGSN informs PCRF 2 that it is not allowed to set values for the UE's UE-AMBR.

Figure 4:
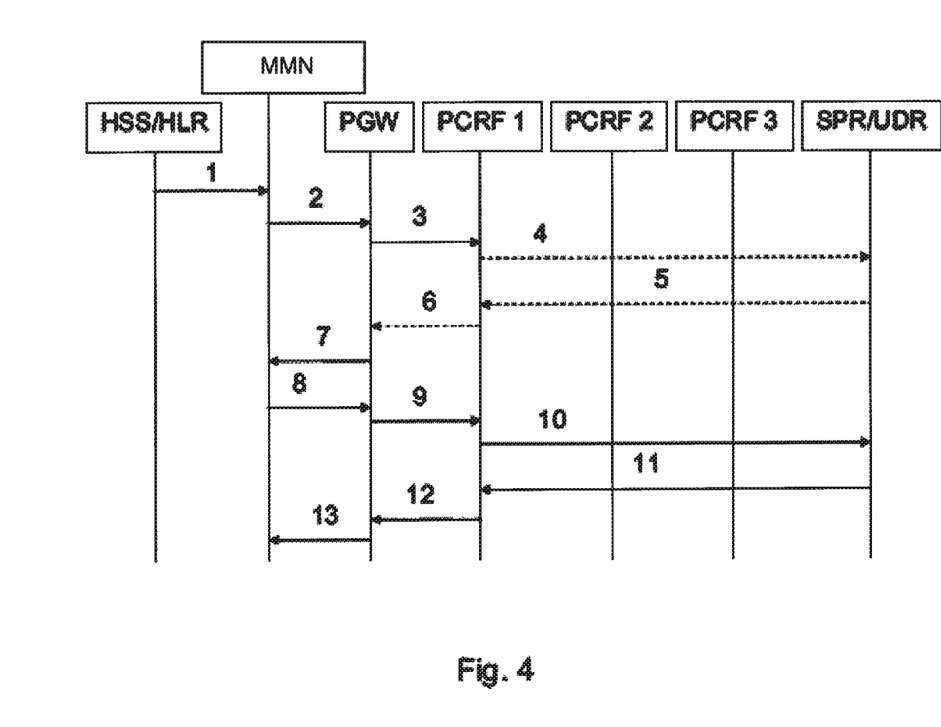
FIG. 4 shows a signaling diagram.

FIG. 4 shows a signaling diagram in a PLMN such as the one 101 shown in FIG. 1, in which the invention is used. The node shown as HSS/HLR in FIG. 4 is a Home Subscriber Server or a Home Location Register, and the node shown as PGW is a PDN Gateway.

The PGW shown in FIG. 4 can, depending on the embodiment and the kind of system, either be a so called PDN-GW, i.e. a Packet Data Network Gateway or a GGSN, Gateway GPRS Support Node. It should be pointed out that not all nodes which are present in the PLMN are shown in FIG. 4. For example, the UE in question, i.e. the UE for which the UE-AMBR is to be determined and set by a PCRF function is not shown in FIG. 4.

The signaling diagram of FIG. 4 will be described in numbered steps below, where the steps are numbered with reference to the numbered arrows in FIG. 4. In FIG. 4, arrows 4-6 are shown with dashed lines, in order to show that the invention may be used even in cases where a separate PCRF function is not deployed, in which case a "local" PCRF-function will be used, located in the PGW. Also, a plurality of PCRFs is shown in FIG. 4, i.e. PCRF 1-3, in order to show that more than one PCRF may occur in the signaling diagram.

1. At the PDN-connection establishment procedure for an UE, the value for the UE's subscribed UE-AMBR is sent from the HSS/HLR to MME/SGSN.

2. At the PDN-connection establishment, the MME/SGSN sends a Create Session Request message, which includes the value for the UE's subscribed UE-AMBR, and, optionally, an information element here referred to as "NO-MASTER-PCRF-DOMAIN" in order to indicate to the PCRF that the upper limit of the UE-AMBR for this UE has not been set by any other PCRF. In case of an SGSN, either the S4-interface or the Gn/Gp-interfaces can be used. In the case of a so called S4-SGSN, the message is Create Session Request, as described above, and in the case of a Gn/Gp-SGSN, the parameters described in this step are included in the message Create PDP Context Request.

3. The PGW initiates a Gx-session, and transmits the value of the UE's subscribed UE-AMBR and the element referred to above as NO-MASTER-PCRF-DOMAIN, if that element was received from the MME/SGSN.

4. The PCRF, here PCRF1, although the same is true for either PCRF2 and PCRF3 as well, requests information from the SPR or UDR, i.e. SPR/UDR, to find out if PCRF1 is allowed to determine the upper limit of the UE-AMBR for the UE, i.e. if PCRF1 is allowed to set a value for the UE's authorized UE-AMBR.

5. PCRF1 receives information from the SPR/UDR on whether the PCRF1 is allowed to set the UE's authorized UE-AMBR or not. If the PCRF is allowed to set the UE-AMBR, PCRF1 then sets a value for the UE's authorized UE-AMBR. This is also where PCRF1, if it is "the first PCRF", receives both an authorization query and a corresponding authorization reply from the SPR/UDR.

Steps 6-13 below only apply if PCRF1 was allowed by the SPR/UDR to change the UE's authorized UE-AMBR.

6. PCRF1 includes its value for the UE's authorized UE-AMBR, and also includes an authorization query and a corresponding authorization reply, as received from the SPR/UDR.

7. PDN-GW/GGSN sends Create Session Response/Create PDP Context Response including the authorized UE-AMBR, the authorization query and the corresponding authorization reply to the MME/SGSN, which marks the PDN connection as MASTER-PCRF-DOMAIN. The authorized UE-AMBR is allowed to be set (changed) again by PCRF1 at a later occasion by providing a new value, using existing 3GPP modification procedures for this PDN connection.

8. If the UE requests a new PDN connection establishment, MME/SGSN sends Create Session Request (in case MME or S4-SGSN) or Create PDP Context Request (in case Gn/Gp-SGSN) the authorization query 'abc'.

9. DN-GW/GGSN initiates a new Gx-session and includes MASTER-PCRF-DOMAIN (included to PCRF if received by PDN-GW/PCRF) and the authorization query 'abc'.

10. The PCRF includes the authorization query (e.g. "abc") to the UDR/SPR and expects as a request the authorization reply, e.g. "xyz".

11. The UDR/SPR includes the authorization reply, e.g. 'xyz' to PCRF in the response.

12. The PCRF includes the authorization reply, 'xyz', indicating that it is allowed to set the upper limit for the UE-AMBR.

13. PDN-GW/GGSN sends Create Session Response/Create PDP Context Response, including the authorization reply, if included by PCRF in the previous step. The MME/SGSN now allows the authorized UE-AMBR to be changed if received either on this PDN connection or on the first PDN connection. If the Create Session Response/Create PDP Context Response does not include the correct the authorization reply, e.g. 'xyz', to the authorization query, e.g. 'abc', then this PDN connection (or, rather, the PCRF in question) is not allowed to set the authorized UE-AMBR.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

The invention claimed is:

1. A policy control node (PCN) for a first Public Land Mobile Network (PLMN), the PCN comprising a Policy and Charging Rules Function (PCRF), the PCN being arranged to have an interface towards a Subscription Profile Repository/User Data Repository (SPR/UDR) in the first PLMN, the PCRF of the PCN being arranged to receive a request from another node in the first PLMN or in a second PLMN for establishing a connection for a user equipment (UE), the PCN being arranged to, as a result of said request, send a query to the SPR/UDR regarding whether or not the PCRF is allowed to set an upper limit for the UE Aggregate Maximum Bit Rate (UE-AMBR) for the UE in question, the PCRF being arranged to, if a reply from the SPR/UDR to the query is positive, determine and transmit the upper limit of the UE-AMBR for the UE in question to said another node.

2. The PCN of claim 1, being arranged to have a Gx interface towards a Gateway GW node in the first PLMN, and to receive said request for establishing a connection for a certain UE from the GW node over said Gx interface.

3. The PCN of claim 1, being arranged to have an S9 interface towards another PCRF in the second PLMN, and to receive said request for establishing a connection for a UE from the other PCRF over said S9 interface.

4. The PCN of claim 1, in which the PCRF is arranged to receive an authorization query and a corresponding authorization reply in reply to the PCRF's query to the SPR/UDR, and to transmit said authorization query and corresponding authorization reply to said another node.

5. The PCN of claim 1, in which the PCRF is arranged to receive an authorization query in the request from said another node for establishing a connection for a UE, and to use said authorization query in the PCRF's query to the SPR/UDR, and to receive an authorization reply from the SPR/UDR for transmission to said another node, said authorization reply signifying that the PCRF is allowed to set the upper limit of the UE-AMBR for the UE in question.

6. The PCN of claim 1, wherein the connection is a Packet Data Network (PDN) connection.

7. A mobility management node for a Public Land Mobile Network (PLMN), the mobility management node being arranged to send, via a Gateway node, a request to a policy control node (PCN) for establishing a connection for a user equipment (UE), the mobility management node being arranged to receive from the PCN, in reply to said request, an upper limit of an Aggregate Maximum Bit Rate for the UE, wherein the mobility management node is arranged to receive from the PCN an authorization query and a corresponding authorization reply for use in verifying that a Policy and Charging Rules Function (PCRF) in the PCN is allowed to change the upper limit of the Aggregate Maximum Bit Rate of the UE.

8. The mobility management node of claim 7, being one of: a Mobility Management Entity and a Serving General packet radio service Support Node.

9. A method for use in a communications network comprising a policy control node (PCN) that comprises a Policy and Charging Rules Function (PCRF) and a user information repository, the method comprising: the PCN receiving a connection establishment request for establishing a connection for a user equipment (UE), the connection establishment request having been transmitted by a first network node; in response to receiving said connection establishment request, the PCN sending a query to the user information repository regarding whether or not the PCN is allowed to set an Aggregate Maximum Bit Rate (AMBR) upper limit for the UE; the PCN receiving a response to said query from the user information repository; the PCN determining whether the response indicates that the PCN may set said AMBR upper limit; and in response to the PCN determining that the PCN may set said AMBR upper limit, the PCN determining an ABMR value to be used as the upper limit of the AMBR for the UE, and the PCN transmitting the determined AMBR value to the first network node.

10. The method of claim 9, further comprising: the first network node receiving a message from a second network node; and the first network node, in response to the message, transmitting said connection establishment request to the PCN.

11. The method of claim 10, wherein the first network node is a Packet Data Network Gateway (PGW), and the second network node is a mobility management node.

* * * * *

UNITED STATES PATENT AND TRADEMARK OFFICE
CERTIFICATE OF CORRECTION

| | | |
|---|---|---|
| PATENT NO. | : 9,215,291 B2 | |
| APPLICATION NO. | : 13/289387 | |
| DATED | : December 15, 2015 | |
| INVENTOR(S) | : Karlsson et al. | |

It is certified that error appears in the above-identified patent and that said Letters Patent is hereby corrected as shown below:

In the specification,

In Column 2, Line 35, delete "LIE system" and insert -- LTE system --, therefor.

In Column 4, Line 18, delete "V-PCRF 125," and insert -- V-PCRF 127, --, therefor.

Signed and Sealed this
Fourteenth Day of June, 2016

Michelle K. Lee
*Director of the United States Patent and Trademark Office*